United States Patent
Warner

[11] Patent Number: 5,325,689
[45] Date of Patent: Jul. 5, 1994

[54] ANTITHEFT DEVICE FOR USE ON BICYCLES

[75] Inventor: David J. Warner, Cheshire, United Kingdom

[73] Assignee: Maureen Warner, Knokker-Heist, Belgium

[21] Appl. No.: 940,481

[22] Filed: Sep. 4, 1992

[30] Foreign Application Priority Data

Sep. 19, 1991 [GB] United Kingdom ............ 9119990
Nov. 8, 1991 [GB] United Kingdom ............ 9123837

[51] Int. Cl.⁵ ............................................. E05B 71/00
[52] U.S. Cl. ............................................. 70/233; 70/18
[58] Field of Search ............... 70/233, 58, 14, 18, 70/30, 49, 53, 234; 403/102, 99, 116; 292/63, 339; 223/89, 94

[56] References Cited

U.S. PATENT DOCUMENTS

| 598,656 | 2/1898 | Colton | 70/53 |
|---|---|---|---|
| 652,414 | 6/1900 | Wilson | 403/99 |
| 926,013 | 6/1909 | Murdoch | 403/102 |
| 3,747,376 | 7/1973 | White, Jr. | 70/233 |
| 3,748,876 | 7/1973 | Mathews | 70/18 |
| 3,908,414 | 9/1975 | Thorne | 70/18 |
| 3,922,894 | 12/1975 | Johnson | 70/18 |
| 3,959,995 | 6/1976 | Fletcher | 70/18 |
| 4,004,721 | 1/1977 | Ross | 223/89 |
| 4,760,718 | 8/1988 | Muramutsa et al. | 70/49 |
| 5,018,374 | 5/1991 | Montano | 70/233 |
| 5,065,603 | 11/1991 | Kloke | 70/233 |

FOREIGN PATENT DOCUMENTS

| 335862 | 11/1919 | Fed. Rep. of Germany | 70/18 |
|---|---|---|---|
| 1008599 | 5/1957 | Fed. Rep. of Germany | 70/53 |
| 2503077 | 10/1982 | France | 70/233 |
| 249467 | 4/1948 | Switzerland | 403/99 |
| 2222851 | 9/1989 | United Kingdom | |

OTHER PUBLICATIONS

European Patent Search Application No. 92307359.7 Warner.

Primary Examiner—Peter M. Cuomo
Assistant Examiner—Darnell Boucher
Attorney, Agent, or Firm—Salter, Michaelson & Benson

[57] ABSTRACT

An antitheft device for use on bicycles. The device has three limbs (1,2,3) which are pivotally connected to each other. In, use the limbs (1,2,3) are lockable around part of a bicycle (8) and/or fixed structure in a triangular configuration. When not in use the limbs are unlocked and folded one within another to a rectilinear configuration for storage or carrying purposes. The device has the advantages of being compact in the folded position to facilitate storage on part of the bicycle frame.

22 Claims, 2 Drawing Sheets

ANTITHEFT DEVICE FOR USE ON BICYCLES

This invention relates to an antitheft device for the prevention of theft of a bicycle.

The term "bicycle" is used hereinafter to cover other similar vehicles such as tricycles or tandems.

Known antitheft devices include a chain and padlock, and a U-shaped member having a lockable crossbar closing the U-shape. both devices do not facilitate portability when they are not in use. A chain can either be carried around by the cyclist or alternatively can be wrapped around part of the bicycle structure, in the latter case the chain and padlock has tendency to knock or rub against the bicycle which can cause damage to the paintwork etc. and causes irritating noise. In addition, when stored on the bicycle they can impede the cyclist during the journey. Similar problems are presented with the U-shaped device. In particular, U-shaped devices are known to swivel relative to a holder on the bicycle frame to impede the motion of the cyclist which is potentially dangerous.

Furthermore, the known devices are generally bulky and heavy making them expensive to manufacture and difficult to carry around.

It is an object of the present invention to obviate or mitigate the aforesaid disadvantages.

In accordance with the present invention there is provided a device for prevention of theft of a bicycle comprising at least three limbs pivotable relative to each other and lockable in a first position whereby they form a frame having an internal space within which a part of the bicycle structure and optionally another structure can be received wherein the limbs are pivotable to a second position whereby the limbs are unlocked and can be received one within another to form a rectilinear configuration such that the device can be attached substantially in parallel, to a rectilinear part of said bicycle.

Preferably in said first position the limbs form a closed frame having an internal space within which a part of the bicycle structure and another structure can be received and wherein the limbs are pivotable to a second position whereby a connection between two of the limbs is broken so that the three limbs can be substantially aligned to form the rectilinear configuration.

Preferably said device is attached to said bicycle structure in said second position by means of a clip which passes around said structure and said device.

Alternatively said device can be attached to said bicycle frame in said second position by means of a strip of VELCRO (Registered Trade Mark) which passes over said structure and said device.

Preferably at least some of said limbs are formed from channel shaped members of different cross-sectional dimensions such that in said second position the limbs are pivoted to be received one within another to form said rectilinear configuration.

Preferably said limbs are formed from hardened steel.

Preferably there is a lock on the device which can lock two of the three limbs together in said first position.

Preferably said limbs are formed to correspond with the surface of the bicycle structure when in said second position.

Alternatively there is provided a shaped insert to be positioned between the bicycle structure and the device, having opposed contoured surfaces designed to receive both.

Preferably the limbs are biased to said second position.

Preferably said connection between the two limbs is achieved by one limb being received in an aperture in the other.

In one embodiment said aperture limb has a series of apertures along its length allowing different sizes of triangle to be formed.

In an alternative embodiment the limbs of the device are in a telescopic arrangement whereby at least one limb is in the form of a sleeve adapted to receive another limb in a telescopic relationship such that the device telescopically extends and the limbs pivot to form said frame, the limbs being telescopically receivable one within another to form said rectilinear configuration.

Preferably there is an outer limb having a pin which is received in a groove in a second limb such that said second limb can slide within said outer limb by means of the groove and pin connection.

Preferably said pin is the pivot point about which said second limb can pivot relative to said outer limb.

Preferably each successive limb in the device has the abovedescribed pin and groove connection.

Preferably the terminal limb of the device remote from the outer limb is a solid bar with a groove formed therein and has an end which can be received within an aperture in said outer limb and locked thereto.

Preferably the terminal limb has a series of apertures formed therein each of which apertures are designed to receive the locking member of said locking device such that there are a number of alternative locking positions.

Specific embodiments of the present invention will now be described by way of example with reference to the accompanying drawings in which.

Figure 1:
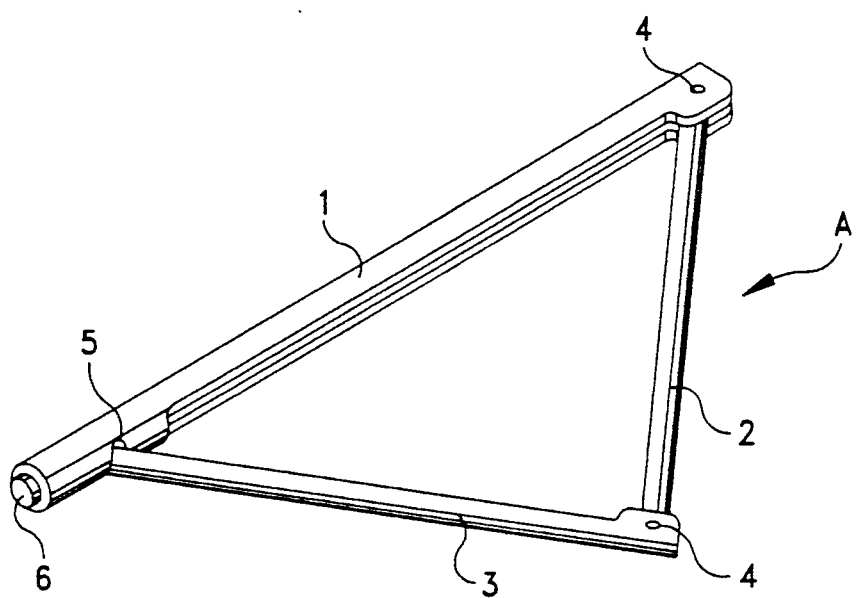
FIG. 1 is a perspective view of a first embodiment of an antitheft device in a triangular configuration.
Figure 2:
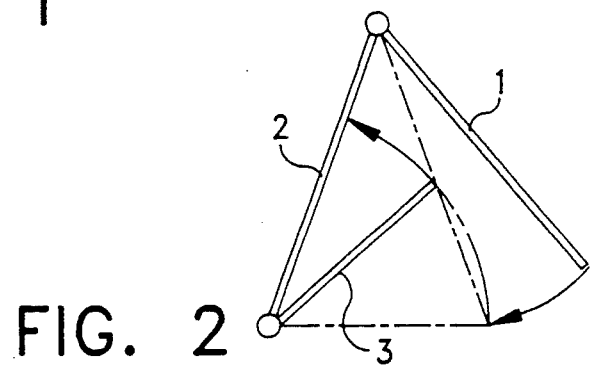
FIG. 2 is a diagrammatic representation showing the manner of collapsing the device of FIG. 1.

Referring to FIGS. 1–4 there is shown an embodiment of an antitheft device for a bicycle, indicated generally by arrow A, having three limbs 1,2,3. Limbs 1 and 3 are of arcuate channel shaped cross section and limb 2 is a solid rod. Each limb is of a different cross sectional dimension. Limb 1 is the largest in cross section and is connected at one end to an end of limb 2 by means of, for example, a rivet or a pin 4. At the opposite end of limb 2 there is similarly connected a limb 3 of smaller cross section than limb 2. The free end of limb 3 is designed to be received in an aperture 5 formed in the free end of limb 1. The free end of limb 1 carries a barrel type lock 6 which is designed to lock together limbs 1 and 3 when the free end of limb 3 is inserted in the aperture 5, thus forming a triangular shape. The locking member of the barrel lock 6 passes into an aperture (not shown) in limb 3. The limb 3 may have a series of apertures (not shown) along its length to enable differing sizes of triangle to be formed. In this case the aperture 5 in limb 1 would pass through to the other side to allow limb 3 to pass through limb 1 and move relative to it.

Figure 5:
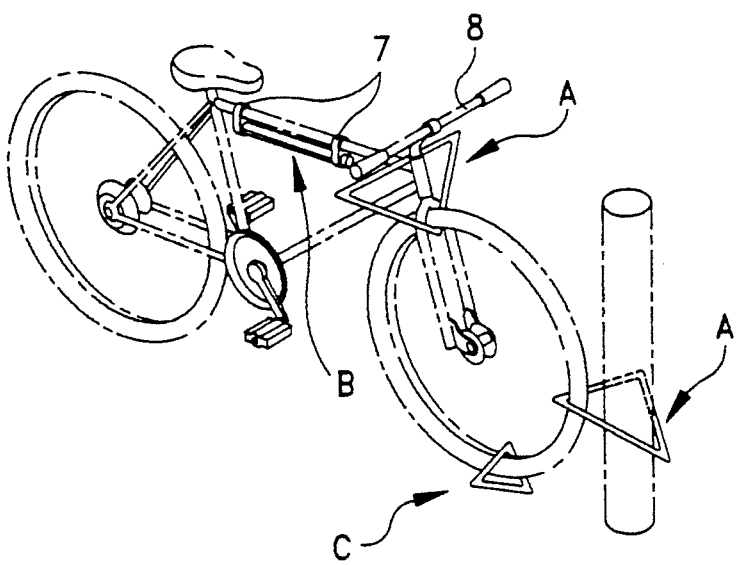
FIG. 5 is a perspective view of a bicycle with the device of FIG. 1 shown in a number of possible positions.

In use, the device can be locked in the form of a triangle A as shown in FIGS. 1 and 5. The triangle A forms an area in which parts of the bicycle structure can be received, for example a wheel and/or a frame member, such that the bicycle 8 is immobilised. It is to be appreciated that the bicycle 8 can be locked to a suitable fixed object such as a lamppost by passing the limbs 1,2,3 around the lamppost and a part of the bicycle structure and locking them when in the triangular position. The device may be used to lock around a wheel or the like to inhibit the motion of the bicycle such that it cannot be wheeled away. A scaled down version of the device can be employed for this purpose, as indicated by arrow C in FIG. 5. Alternatively the device may be used to lock several bicycles together to make the theft thereof more difficult.

Figure 3:
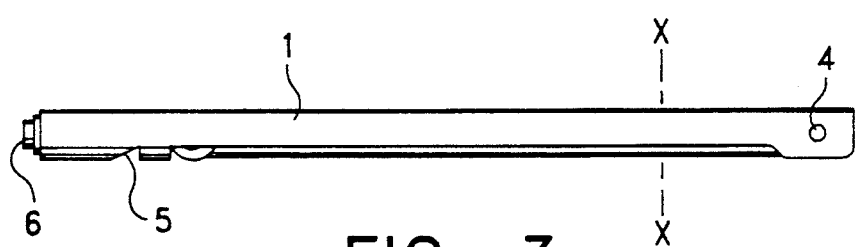
FIG. 3 is a side view of the device of FIG. 1 in a collapsed configuration.
Figure 4:
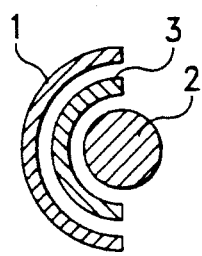
FIG. 4 is cross-sectional view along line X—X of FIG. 3.

When not in use the device is foldable (in a manner indicated in FIG. 2) into a storage position (see FIGS. 3 and 4). Limb 3 is pivoted such that it receives limb 2 and the limbs 1 and 2 are pivoted to reside within the channel of limb 1. In this rectilinear form the device is in a compact easily portable shape and can be attached parallel to a part of the frame of the bicycle 8 (as indicated by arrow B in FIG. 5). The attachment means 7 can be for example VELCRO (Registered Trade Mark) straps, jubilee clips or metal cable style clips which are already in position on the frame or the device itself.

It is to be appreciated that the limbs of the device are constructed from the a suitably strong material such as hardened steel. The limbs 1,2,3 may be of rectangular channel or rectangular cross section. The limb 1 which forms the outer channel member in the collapsed position may have a contoured surface designed to cooperate with the frame shape of the bicycle. Indeed the channel shaped limbs may be of any suitable shape as long as they are foldable into a compact rectilinear shape.

In an alternative embodiment there is provided a shaped holder (not shown) between the frame and the device. The holder is attached to the frame and has opposite grooved channels designed to receive the device and the bicycle frame.

In one preferred embodiment the limbs may be spring loaded to the folded position.

It is to be appreciated that any suitable style of lock may be used. For ease of use the lock may be a barrel type having a button which is depressed once to lock the limbs together and a key to release.

Figure 4A:
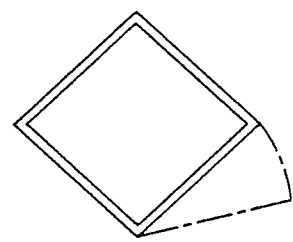
FIG. 4a is a schematic representation of an embodiment of the present invention having four limbs.

It is to be appreciated that the invention is not limited to three limbs only, additional pivotable limbs could be provided each being of differing cross sectional size to allow for the device to be folded into the aforesaid rectilinear configuration. An example of the device having four limbs is shown in FIG. 4a.

Figure 6:
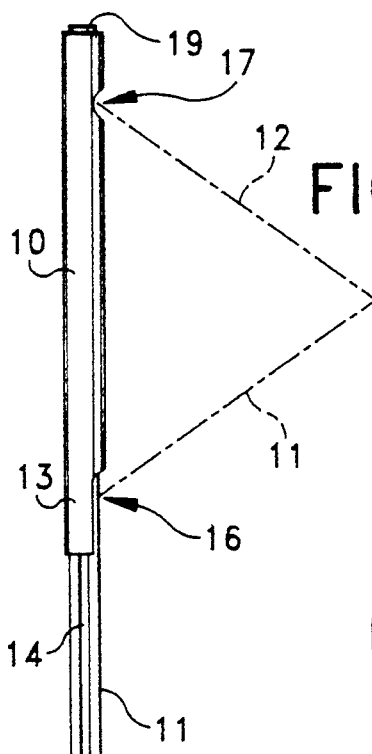
FIG. 6 is a side view of a second embodiment of the present invention in an extended configuration.
Figure 7:
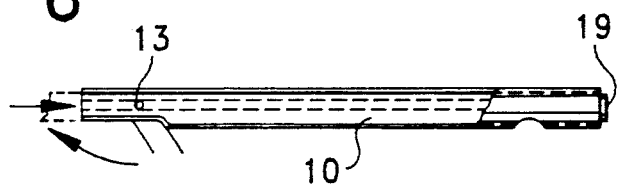
FIG. 7 is a side view of the device of FIG. 6 in a collapsed configuration.

A second embodiment of the present invention is shown in FIGS. 6 and 7. The device has three limbs 10,11,12 of hollow circular cross section. Each limb is of a different cross sectional dimension. Limb 10 is the largest in cross section and is connected at one end to an end of limb 11 by means of, for example, a rivet or a pin 13 which is received in an elongate groove 14 formed along the length of limb 11. At the opposite end of limb 11 there is similarly connected a limb 12 of smaller cross section than limb 11. Limb 12 has similar elongate groove 15. Limbs 10,11 have cut away portions 16 at their right hand ends. The free end of limb 12 is designed to be received in an aperture 17 formed in the free end of limb 10. Limb 12 has an aperture 18 formed at its end circumferentially displaced from the groove 15.

Limb 10 has an axially disposed key-release barrel lock 19 at its free end.

When the device is not in use the limbs 10,11,12 are pivoted and slid telescopically one within another by means of the groove and pin connections to form a compact rectilinear shape as shown in FIG. 7. The device can then be stored on the bicycle as described in the earlier embodiment.

In use, the limbs are extended telescopically and are pivoted as required to form a closed triangular locked shape (shown dotted in FIG. 6) in which parts of a bicycle are received as described in the earlier application. The arcuate cut away portion 16 give clearance to allow one limb to pivot relative to the other into the triangular configuration. The aperture 18 in the limb 12 is designed to receive the locking member of the barrel lock 21. A number of such apertures may be provided to give the user a number of different locking positions to choose from.

In an alternative configuration the device may have more than three limbs. In this configuration, all the limbs can be telescopically extended and pivoted relative to each other to form a closed shape.

Figure 8:
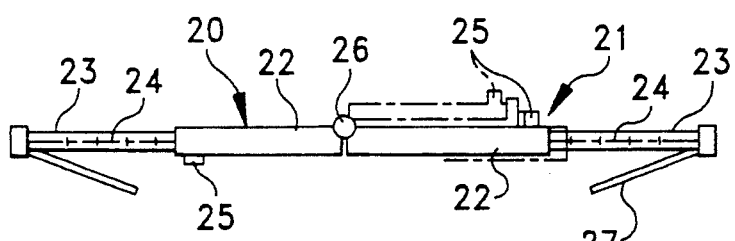
FIG. 8 is a side view of a third embodiment of the present invention.
Figure 9:
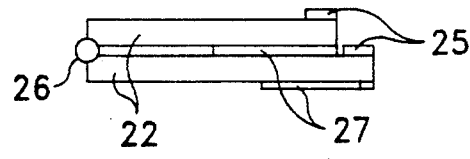
FIG. 9 is a side view of the device of FIG. 8 in a folded configuration.
Figure 10:
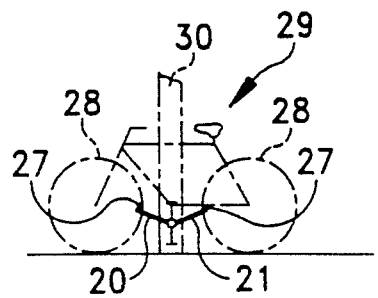
FIG. 10 shows the device of FIG. 8 in use locking a bicycle.

A third embodiment of the device is shown in FIGS. 8 to 10. The device comprises two telescopic bar arrangements indicated generally at 20,21. In both arrangements a cylindrical sleeve 22 slides over a round bar 23 and is moveable relative thereto both axially and rotationally. The bar 23 has apertures or surface grooves 24 into which a locking member can engage. The end of the sleeve has a locking arrangement 25 operable by a key or the like. The two telescopic arrangements 25 are connected by a hinge 26. At the free end of each bar 23 there is an end limb 27 which is pivotable to an acute angle relative to the bar 23. A stopper (not shown) is provided to prevent further pivoting of the end limb 27 away from the bar 23.

In use, the device is fitted around the wheels 28 of a bicycle 29 and, if desired, a fixed immovable object 30, as shown in FIG. 10. The angle of inclination of each end limb 27 to the bar 23 is such that a wide range of sizes of bicycle wheel 28 can be received therebetween. A first wheel is inserted between an end limb 27 and the bar 23 and the device is extended by means of the telescoping arrangements 20,21 to fit the opposite end limb 27 around the other bicycle wheel, the device is then contracted as far as possible and both telescoping arrangements 20,21 are locked. If desired the device can also pass around a fixed immovable object 30 such as a lamppost as shown. The telescoping arrangements 20, 21 may be pivoted relative to each other by means of the hinge 26 in order to help accommodate the post. In this position is securely locked to a post with both the wheels immobilised.

When the device is not in use the end limbs 27 are folded towards the bars 23, the bars 23 are slid into the sleeves 22 and the telescoping arrangements 20, 21 are pivoted by means of the hinge 26 until one rests on the other as shown. As can be seen one sleeve is made longer than the other to allow the locks 25 to fit over each other. In this manner the device can be folded into a rectilinear configuration to allow it to be strapped to the bicycle frame as aforedescribed.

The combination of telescoping arrangement which allows for both axial and rotational movement of the bar relative to the sleeve, the pivotable end limbs and the central hinge facilitates the accommodation of all sizes of bicycle and the positioning of the bicycle to the desired lamppost or the like.

It is to be appreciated that all three embodiments as described may be coated, where appropriate, by a protective plastic coating.

All three embodiments as described provide for a compact, easy to carry, easy to store, lightweight bicycle lock. This is achieved by a compact folding and/or pivoting arrangement which allows one limb to reside within another when the storage position, and the provision of an integral lock arrangement. The lock, when stored on the bicycle frame as shown in inconspicuous, will not impede the cyclist or cause an irritating noise by knocking against the bicycle during the journey.

I claim:

1. A bicycle antitheft device comprising at least three substantially rigid limbs and a security lock housed in one of said limbs, two of said limbs being pivotally attached to one other of said limbs, said limbs being lockable with said lock in a first position wherein said limbs cooperate to define a closed frame structure having an open interior area, wherein said device is securable to a bicycle so that a portion of said bicycle passes through said open interior area, said limbs being pivotable for movement to a second position in which all of said limbs, other than a first one of said limbs, are nested within the first limb and cooperate therewith to form a rectilinear structure which is securable in substantially parallel relation to a rectilinear portion of said bicycle.

2. A bicycle antitheft device comprising at least three substantially rigid limbs and a security lock on one of said limbs, two of said limbs being pivotally attached to another one of said limbs, said limbs being lockable with said lock in a first position wherein said limbs cooperate to define a closed frame structure having an open interior area, wherein said device is securable to a bicycle so that a portion of said bicycle passes through said open interior area, said limbs being pivotable for movement to a second position in which one of said limbs is nested within at least two other of said limbs and cooperates therewith to form a rectilinear structure which is securable in substantially parallel relation to a rectilinear portion of said bicycle.

3. An antitheft device according to claim 2 wherein in the first position the limbs form a closed frame structure having an open interior area within which a part of the bicycle and another structure can be received and wherein two of the limbs are releasably connected and pivotable to a second position by breaking the releasable connection between the two releasably connected limbs so that the at least three limbs can be substantially aligned to form the rectilinear structure.

4. An antitheft device according to claim 2, wherein said device is attached to said bicycle structure in said second position by means of a clip which passes around said structure and said device.

5. An antitheft device according to claim 2, wherein said device can be attached to said bicycle frame in said second position by means of a strip of VELCRO (Registered Trade Mark) which passes over said rectilinear portion of said bicycle and said device.

6. An antitheft device according to claim 2, wherein at least some of said limbs are formed from channel shaped members of different cross-sectional dimensions such that in said second position the limbs are pivoted to be received one within another to form said rectilinear structure.

7. An antitheft device according to claim 2, wherein said limbs are formed from hardened steel.

8. an antitheft device according to claim 2, wherein said limbs are formed to correspond with the configuration of the rectilinear portion of the bicycle when in said second position.

9. An antitheft device according to claim 2, wherein there is provided a shaped insert to be positioned between the bicycle and the device, having opposed contoured surfaces designed to receive both.

10. An antitheft device according to claim 2, wherein the limbs are biased to said second position.

11. An antitheft device according to claim 3, wherein said releasable connection between the two releasably connected limbs is achieved by one end of one of said two releasably connected limbs being received in an aperture in the other of said two releasably connected limbs.

12. An antitheft device according to claim 11, wherein one of said two releasably connected limbs has a series of apertures along its length allowing different sizes of frames to be formed.

13. An antitheft device according to claim 2, wherein the limbs of the device are in a telescopic arrangement whereby at least one limb is in the form of a sleeve adapted to receive another limb in a telescopic relationship such that the device telescopically extends and the limbs pivot to form said frame, the limbs being telescopically receivable one within another to form said rectilinear configuration.

14. An antitheft device according to claim 13, wherein there is an outer limb having a pin which is received in a groove in a second limb such that said second limb can slide within said outer limb by means of the groove and pin connection.

15. An antitheft device according to claim 14, wherein said pin is the pivot point about which said second limb can pivot relative to said outer limb.

16. An antitheft device according to claim 14, wherein each successive limb in the device has the said pin and groove connection.

17. An antitheft device according to claim 13, wherein a terminal limb of the device remote from the first limb is a solid bar with a groove formed therein and has an end which can be received within an aperture in said first limb and locked thereto.

18. An antitheft device according to claim 17, wherein the terminal limb has a series of apertures formed therein each of which apertures is designed to receive the locking member of said locking device such that there are a number of alternative locking positions.

19. An antitheft device according to claim 2, wherein there are three limbs which form a triangle in said first position.

20. A bicycle antitheft device comprising first, second and third substantially rigid limbs, said first and third limbs being pivotally attached to said second limb, said limbs being positionable in a first position wherein they cooperate to define a closed frame structure having an open interior area and a security lock for releasably locking said device in the first position, wherein said device is securable to a bicycle so that a portion to said bicycle passes through said open interior area, said limbs also being pivotable for movement to a second position in which said second limb is nested within the first and third limbs and cooperates therewith to form a rectilinear structure which is securable in substantially parallel relation to a rectilinear portion of said bicycle.

21. In the device of claim 20, said third limb having a free end which is received in a predetermined position in said first limb when said device is in said first position, said security lock being mounted in said first limb and engaging said third limb adjacent said free end thereof for securing said device in said first position.

22. In the device of claim 21, said third limb having an aperture therein adjacent said free end thereof, said security lock engaging said third limb in said aperture.

* * * * *